United States Patent
Helbing et al.

(10) Patent No.: US 7,278,776 B2
(45) Date of Patent: Oct. 9, 2007

(54) APPARATUS AND METHOD FOR INJECTING A LIQUID DYE INTO A POLYMER MELT

(75) Inventors: Ulrich Helbing, Burscheid (DE);
Georg Stausberg, Remscheid (DE);
Jörg Alexander, Remscheid (DE);
Jürgen Hasenburg, Radevormwald (DE)

(73) Assignee: Saurer GmbH & Co. KG, Monchengladbach (DE)

( * ) Notice: Subject to any disclaimer, the term of this patent is extended or adjusted under 35 U.S.C. 154(b) by 275 days.

(21) Appl. No.: 11/040,443

(22) Filed: Jan. 21, 2005

(65) Prior Publication Data

US 2005/0128869 A1    Jun. 16, 2005

Related U.S. Application Data

(63) Continuation of application No. PCT/EP03/07435, filed on Jul. 9, 2003.

(30) Foreign Application Priority Data

Jul. 24, 2002    (DE) .............................. 102 33 468

(51) Int. Cl.
*B29C 45/18* (2006.01)
*B01F 15/02* (2006.01)

(52) U.S. Cl. ............... 366/76.1; 366/76.93; 366/182.2; 137/565.3

(58) Field of Classification Search ............ 366/160.2, 366/182.2, 76.1, 76.6; 137/565.29, 565.3; 425/145

See application file for complete search history.

(56) References Cited

U.S. PATENT DOCUMENTS

| 3,023,764 | A |   | 3/1962 | Dooley et al. |
| 3,754,734 | A | * | 8/1973 | Hoyle et al. ............. 425/382.2 |
| 3,754,735 | A | * | 8/1973 | Hoyle et al. ................ 366/132 |
| 4,221,692 | A |   | 9/1980 | Lambertini et al. |
| 4,547,128 | A | * | 10/1985 | Hayes ........................... 417/2 |
| 6,232,371 | B1 |  | 5/2001 | Caswell et al. |
| 6,254,363 | B1 |  | 7/2001 | Fink |
| 2003/0142580 | A1 | * | 7/2003 | Maguire .................... 366/76.6 |

FOREIGN PATENT DOCUMENTS

| DE | 199 56 251 A1 | 6/2000 |
| EP | 0 945 171 | 9/1999 |
| EP | 1 008 750 A1 | 6/2000 |
| EP | 1 020 645 A1 | 7/2000 |
| FR | 991627 A | 10/1951 |
| GB | 1 311 162 | 3/1973 |
| WO | WO 03035346 A | 5/2003 |

* cited by examiner

*Primary Examiner*—Tony G Soohoo
(74) *Attorney, Agent, or Firm*—Alston & Bird LLP

(57) ABSTRACT

An apparatus and a method for injecting a liquid dye into a polymer melt, which includes a metering pump with a metering inlet and a metering outlet. The metering inlet connects to a dye tank and the metering outlet connects to a polymer melt carrying component. To add the liquid dye to the polymer melt in the melt carrying component in a quantity that is as uniform and accurate as possible, the invention provides for connecting the metering inlet of the metering pump to a feed outlet of a feed pump, which connects with its feed inlet to the tank. With that, it is possible to generate a feed pressure at the metering inlet of the metering pump, which can be adapted to an injection pressure at the metering outlet of the metering pump.

13 Claims, 2 Drawing Sheets

APPARATUS AND METHOD FOR INJECTING A LIQUID DYE INTO A POLYMER MELT

CROSS REFERENCE TO RELATED APPLICATION

The present application is a continuation of international application PCT/EP2003/007435, filed 9 Jul. 2003, and which designates the U.S. The disclosure of the referenced application is incorporated herein by reference.

BACKGROUND OF THE INVENTION

The present invention relates to an apparatus for injecting a liquid dye into a polymer melt of the general type disclosed in DE 199 56 251 A1.

To obtain a coloration of the polymer melt when melt spinning synthetic multifilament yarns, it is common practice in the known device to add a liquid dye to the polymer melt and to mix it in a subsequent step. To this end, the dye is stored in a tank. Connected to the tank is a metering pump. The metering pump connects via a line to a spin pump that advances the polymer melt. The spin pump receives the polymer melt via an extruder. To dye the polymer melt, the metering pump adds the liquid dye to the polymer melt in measured quantities.

To obtain over time a uniform and constant coloration of the polymer melt, it is a prerequisite that the liquid dye be supplied to the polymer melt continuously in an exact quantity. However, with the known device there arises the problem that the metering pump must bridge a pressure difference between the liquid dye that is kept under no pressure, and the melt that is supplied under an overpressure. For example, at the outlet of an extruder, the polymer melt advances under an overpressure of about 100 bars. With that, however, the metering pump incurs to an increasing extent volumetric losses, which have a negative effect on a quantity adjustment for metering the dye. A further problem of the known device lies in that the direct connection between the spin pump and the metering pump causes a pressurized polymer melt to flow off directly when the metering pump is kept under no pressure.

It is therefore an object of the invention to further develop an apparatus of the initially described type as well as a method of the initially described type in such a manner that it is possible to add to a polymer melt a liquid dye as accurately metered as possible.

It is a further object of the invention to provide an apparatus of the described type which can be adapted with great flexibility to a spin unit or another melt carrying unit for injecting a liquid dye or liquid additives.

SUMMARY OF THE INVENTION

The above and other objects and advantages of the invention are achieved by the provision of an apparatus for injecting a liquid dye into a polymer melt which includes a metering pump for adding measured quantities of the dye to the melt, together with a feed pump which is connected in a dye feed line which extends between the tank and the inlet of the metering pump.

The special advantage of the invention lies in that a liquid dye can be added to the polymer melt in any position within the melt carrying components of a spin unit or another melt carrying unit by metering the quantity with the greatest possible accuracy. In particular, the invention makes it easily possible to add a dye safely and accurately in places, in which the polymer melt advances through a melt carrying component under a high overpressure. To this end, the metering inlet of the metering pump is connected to a feed outlet of the feed pump, which in turn connects via a feed inlet to the tank. In this respect, an advantage of the invention lies in that there is a separation between the functions of "feeding the dye" and "metering the dye." In this process, the feed pump removes the liquid dye from the tank and supplies it under pressure to the metering pump. Corresponding pressure adjustments at the metering inlet of the metering pump permit setting minimal pressure differences, so that very small volumetric losses occur when metering the liquid dye by means of the metering pump.

To adapt the discharge of the feed pump as much as possible to the metered quantity of the metering pump, an advantageous further development of the invention provides for respectively associating a controllable pump drive to the metering pump and to the feed pump. The pump drives are separately activated via a control unit.

In this connection, the adjustment of a feed pressure at the metering inlet of the metering pump is advantageously monitored and adjusted by arranging a pressure sensor between the feed outlet of the feed pump and the metering inlet of the metering pump. The pressure sensor connects via a signaling line to the control unit, so that it is possible to perform within the control unit a comparison between actual and desired values, and to make in the case of a deviation a corresponding correction directly in the control of the feed pump.

To keep the number of components required for adjustment and control as small as possible, it is advantageous to operate the metering pump and the feed pump by a common pump drive. To ensure that a pressure is able to build up between the feed pump and the metering pump, the feed pump is designed for delivering a greater volume than the metering pump. This makes it possible to obtain a surplus in the delivery of the liquid dye also at the same drive speed of the two pumps.

Since in the case of an excessive delivery it is necessary to keep the feed pressure at the level of a desired value, an advantageous further development of the invention provides for connecting the feed outlet of the feed pump via a feed line to the metering inlet of the metering pump. In this case, the feed line is coupled via a pressure control valve with a bypass line. The pressure control valve makes it possible to adjust a desired value of the feed pressure within the feed line. If the desired value of the pressure is exceeded, a portion of the liquid dye will be discharged from the feed line via the pressure control valve and the bypass line.

Advantageously, the bypass line is coupled directly with the tank or with the feed inlet of the feed pump, so that no losses of liquid dye are incurred.

The invention offers the special advantage that it permits selecting a position that is especially suited for injecting the liquid dye within the spin unit or another melt carrying unit. To this end, the metering pump is constructed as a structural unit with a melt connection associated to the metering outlet and with a dye connection associated to the metering inlet. The structural unit can be connected by means of the melt connection selectively to one of a plurality of melt carrying components of a spin unit, or to another melt carrying unit. Thus, already the use of a simple metering pump makes it possible to realize an adequately accurate addition of the liquid dye to the polymer melt.

In a particularly preferred further development of the invention, a return flow device is associated to the metering outlet of the metering pump, which prevents the polymer melt from returning from the melt connection into the metering outlet. This enables process sequences, connections, and separate shutdowns of the metering pump without the occurrence of an unacceptable discharge of the polymer melt.

Advantageously, the return flow device may be a nonreturn valve or a freeze valve. In the case of a freeze valve, it would already suffice to use a heated tubular section of a length that is dimensioned such that a returning polymer melt solidifies inside the unheated tubular section. To release the return flow device, one would then heat the tubular section. Advantageously, a reliable and fast acting return flow device may also be a nonreturn valve, which allows only the flow of the liquid dye.

To improve the removal of the liquid dye from the tank, an advantageous further development of the invention proposes to connect the tank with a source of pressure, which permits generating a gas cushion that acts upon the dye stored in the tank. In this case, air or nitrogen is especially suited as a gas, whereas it is irrelevant, whether the tank is a direct component of the structural unit or set up separately and connected via lines to the metering pump or the feed pump.

Basically, all components carrying the liquid dye can be constructed for heating, so as to be able to inject in particular also highly viscous dyes. It is thus possible to make structural units as well as connected hoses heatable.

The method of the invention distinguishes itself in particular in that the liquid dye can be added to the polymer melt in a predetermined quantity without significant fluctuations in the metering. The method of the invention is especially suited for adding a liquid dye, as shortly as possible before melt spinning or extruding the polymer melt, for example to synthetic fibers. In so doing, the liquid dye is delivered from the tank by means of a feed pump, and supplied to the metering pump under a feed pressure. Thus, a pressure difference is operative at the metering pump, which is dependent on the injection pressure in the metering pump and the feed pressure of the feed pump.

To incur as little volumetric losses as possible when metering the liquid dye, the feed pressure of the liquid dye at the metering inlet of the metering pump is advantageously adjusted equal to or smaller than the injection pressure of the liquid dye at the metering outlet of the metering pump. However, it is also possible to adjust a somewhat higher feed pressure; decisive is only the presence of a differential pressure.

The interaction of the feed pump and the metering pump can be realized in accordance with two alternative variants of the method. In a first variant of the method, the delivery volume of the feed pump is adjusted such that the feed pressure of the liquid dye is substantially constant at the metering inlet of the metering pump. This variant of the method distinguishes itself by great flexibility and adjustability.

In an alternative variant, the delivery volume of the feed pump is selected greater than the delivery volume of the metering pump. With that, a surplus is delivered at the same drive speed of the feed pump and the metering pump, so that the feed pressure can be adjusted via a simple pressure adjustment and discharge of excessive dye. This variant distinguishes itself in particular by requiring few drive and control components.

BRIEF DESCRIPTION OF THE DRAWINGS

In the following, the apparatus and method of the invention are further described by means of several embodiments of the invention, with reference to the attached drawings, in which.

DETAILED DESCRIPTION OF THE PREFERRED EMBODIMENTS

Figure 1:
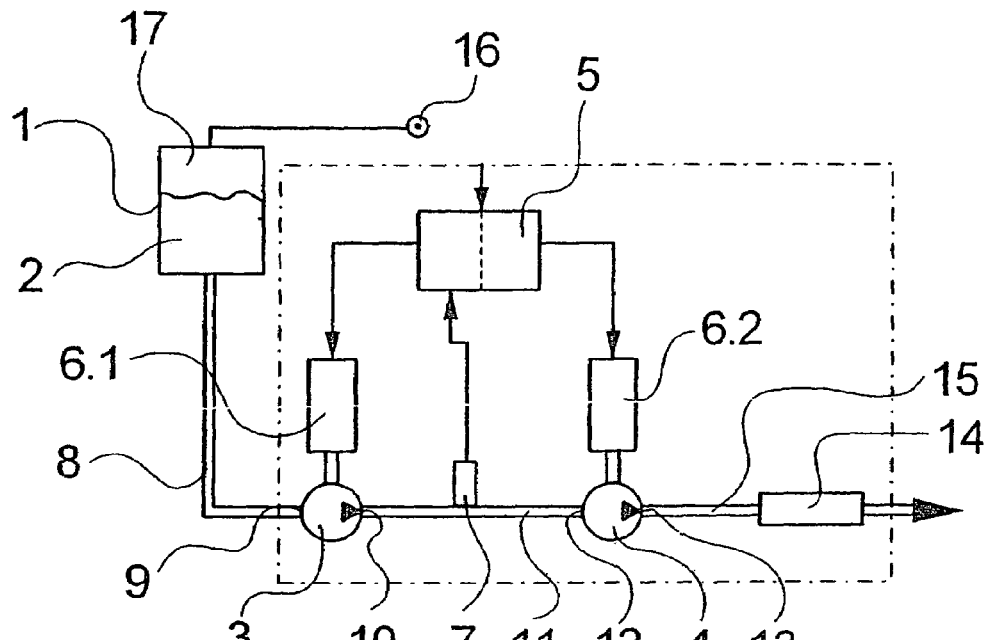
FIG. 1 is a schematic view of the layout of a first embodiment of the apparatus according to the invention.

FIG. 1 illustrates the layout of a first embodiment of the apparatus according to the invention for carrying out the method of the invention.

The apparatus comprises a feed pump 3 and a metering pump 4. The feed pump 3 connects via a feed inlet 9 and an inlet portion of a dye feed line 8 to a tank 1. The tank 1 contains a liquid dye 2 and may be made heatable. The tank 1 is made airtight and connects on the opposite side of the line 8 to a source of pressure 16. The source of pressure 16 permits a pressure medium, for example, air or nitrogen, to be introduced into a free space above the dye 2 inside the tank 1, so that a gas cushion 17 forms.

The feed pump 3 connects via a feed outlet 10 with a downstream portion of the dye feed line 11 to a metering inlet 12 of the metering pump 4. The metering pump 4 connects via a metering outlet 13 and a metering line 15 to a polymer melt carrying component (not shown). The metering line 15 includes a return flow device 14.

The feed pump 3 is operated by a pump drive 6.1 and the metering pump 4 by a pump drive 6.2. The pump drives 6.1 and 6.2 are activated via a control unit 5. The control unit 5 is coupled with a pressure sensor 7 which is associated to the feed line 11 to measure a feed pressure within the feed line 11.

To add the liquid dye 2 in measured quantities from the tank 1 to a polymer melt within a melt carrying component, the feed pump 3 and the metering pump 4 are separately driven by the pump drives 6.1 and 6.2. The pump drive 6.2 of the metering pump 4 is controlled by the control unit 5 in such a manner that the metering pump 4 supplies a desired quantity of the liquid dye continuously via the metering line 15 to the polymer melt carrying component. In this process, the liquid dye advances in the metering line 15 under an injection pressure. To keep volumetric losses within the metering pump 4 as small as possible, the pump drive 6.1 of the feed pump is controlled by the control unit 5 in such a manner that the flow rate of the feed pump 3 generates a predetermined feed pressure in the feed line 11.

The feed pressure at the metering inlet 12 and the injection pressure at the metering outlet 13 of the metering pump 4 form a pressure difference which is optimized for metering the dye. The adjustment of the pressure difference is influenced and controlled by the adjustment of the feed pressure. The feed pressure within the feed line 11 is measured by the pressure sensor 7 and supplied to the control unit 5. Within the control unit 5, the respective actual value of the feed pressure is compared with a desired value of the feed pressure, which has been stored or adjusted in the control unit 5. In the case that a deviation is found between the desired value and the actual value of the feed pressure, the control unit 5 will generate a corresponding control signal for changing the rotational speed of the drive 6.1 of feed pump 3. In this process, the feed pump 3 removes the dye 2 from the tank 1. For a better removal of the dye 2 from the tank 1, a gas cushion 17 acts upon the liquid level of the dye 2 within the tank 1.

Between the metering pump 4 and the melt carrying component (not shown) the metering line 15 includes a return flow device 14. The return flow device 14 is constructed such that it prevents the polymer melt from flowing back from the melt carrying component to the metering pump 4. Thus, it is possible to perform, for example, a dye change without interrupting the connection to the melt carrying component. Likewise, the return flow device 14 permits the metering pump 4 and the feed pump 3 to be started up or shut down regardless of the melt pressure of the polymer melt.

The return flow device 14 could be in the form of a nonreturn valve, in which a valve seat cooperates with a movable control means. In this process, the dye 2 delivered by the metering pump 4 will pass the valve seat unimpeded. However, the control means will block the opposite flow direction, in that it closes the valve seat. The return flow device 14 could also be in the form of a heated tubular section which is dimensioned in its length such that in its unheated state a returning polymer melt will solidify within the tubular section. The tubular section would be heated only in the case that after the solidification of the polymer melt, the flow is interrupted in both directions. The solidified melt in the tubular section will then separate, and can be flushed away by the dye that is delivered by the metering pump 4.

The layout of the device according to the invention as shown in FIG. 1 can either be realized by individual separate units that are connected via lines, or be combined to a structural unit.

Figure 2:
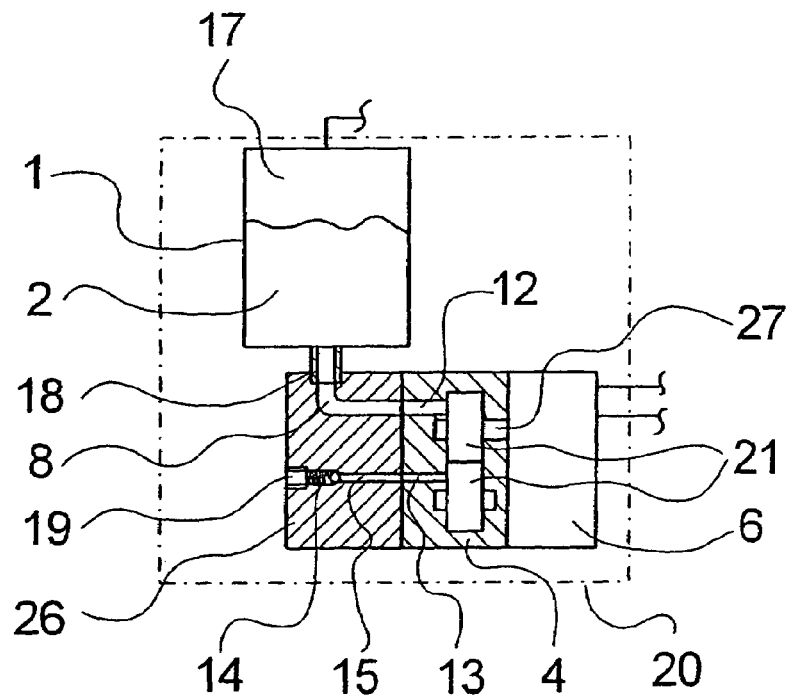
FIG. 2 is a schematic cross sectional view of a further embodiment of the apparatus according to the invention.

FIG. 2 schematically illustrates a cross sectional view of a further embodiment of the device according to the invention. In this Figure, components of the same function have been provided with identical numerals. The device comprises a metering pump 4 and a distributor block 26, which are combined to a structural unit 20. The distributor block 26 and the metering pump 4 are directly flanged to each other in the fashion of plates. The metering pump 4 is constructed as a gear pump with a pair of gears 21. The pair of gears 21 is driven via the pump drive 6 and a drive shaft 27.

Inside the distributor block 26, an inlet line 8 is formed which connects to the metering inlet 12 of the metering pump 4. The inlet line 8 ends in a dye connection 18 that directly connects to a tank 1. Laterally offset from the dye connection 18, the distributor block 26 contains a melt connection 19. The melt connection 19 connects via the metering line 15 to the metering outlet 13 of the metering pump 4. In the metering line 15, within the distributor block 26, a return flow device 14 is provided in the form of a nonreturn valve.

Figure 3:
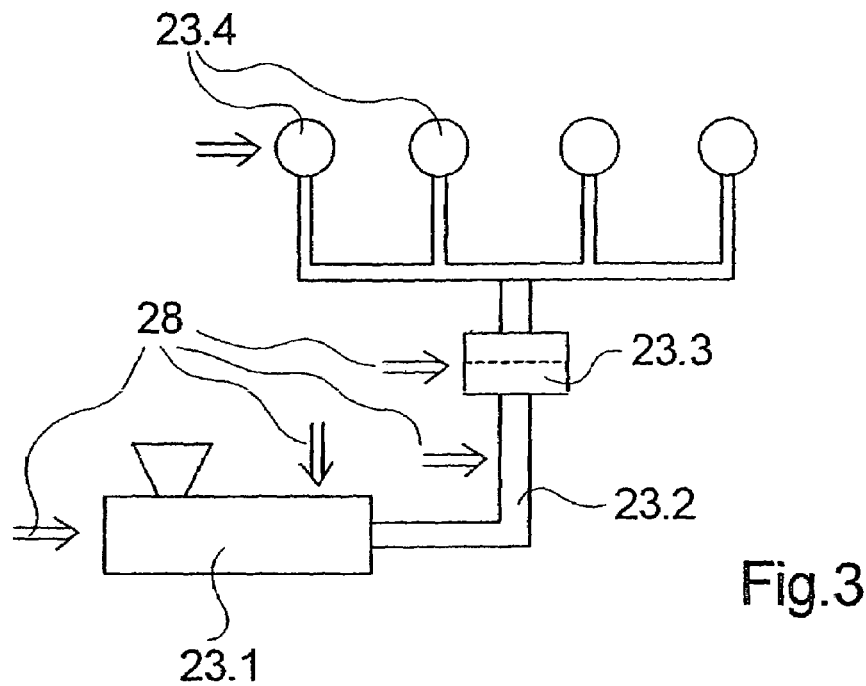
FIG. 3 is a schematic fragmentary view of a spin unit.

The structural unit 20 can be coupled via the melt connection 19 by means of a hose line, tube line, or flange connection to any desired melt-carrying component of a spin unit. FIG. 3 is a fragmentary view of a spin unit, wherein the possible coupling points 28 to a melt-carrying component 23 are each identified by a double arrow. In the spin unit, the polymer melt is melted in a first step by an extruder 23.1. To this end, the extruder 23.1 receives the polymer in granulated form. From the outlet side of the extruder 23.1, a melt line 23.2 extends, which supplies the polymer melt to a plurality of spinning positions. Each of the spinning positions includes a spin pump 23.4. FIG. 3 illustrates, for example, four spin pumps 23.4. In the present embodiment, the melt line 23.2 contains an additional dynamic mixer 23.3.

To be able to dye the polymer by a liquid dye, the structural unit 20 can be selectively arranged on one of the coupling points 28. Thus, it would be possible to supply the liquid dye to the melt both in the inlet region and in the outlet region of the extruder 23.1. Advantageously, however, the liquid dye is supplied to the polymer melt directly downstream of the extruder 23.1. In this case, one could join the structural unit of FIG. 2 directly to the melt line 23.2, or to the mixer 23.3, or to the spin pumps 23.4. Suitably, the spin pump 23.4 is constructed as a mixing pump with an integrated mixer.

Figure 4:
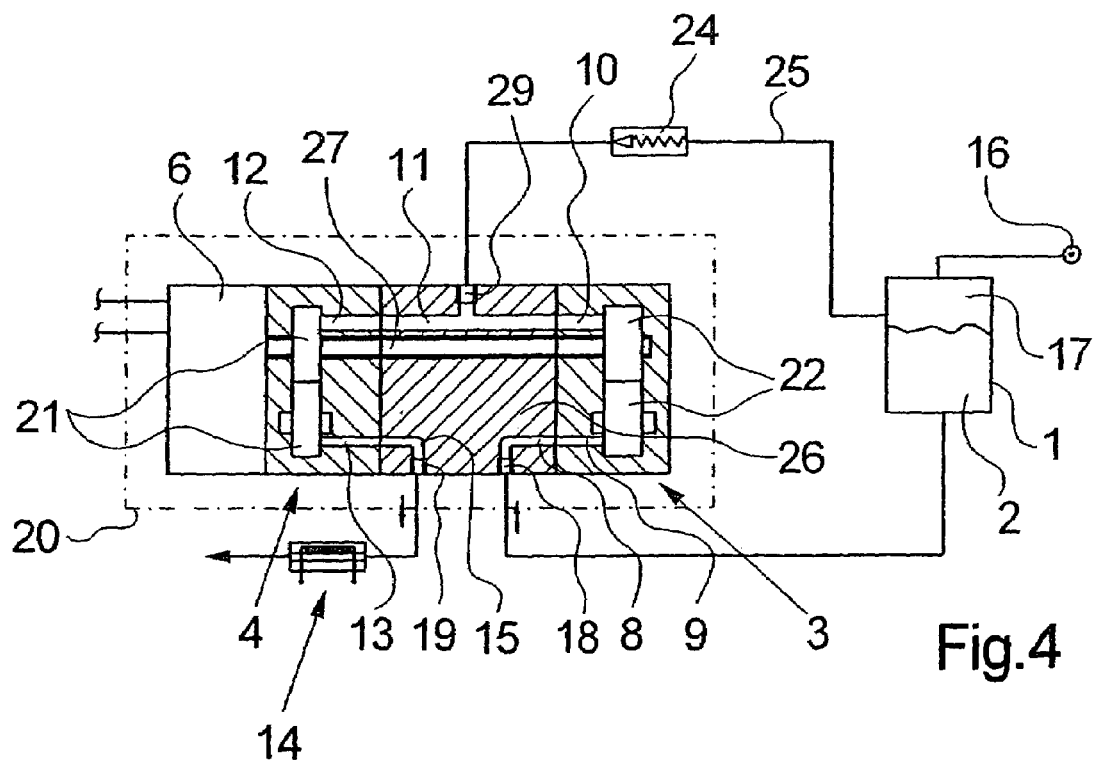
FIG. 4 is a schematic cross sectional view of a further embodiment of the apparatus according to the invention.

FIG. 4 schematically illustrates a cross sectional view of a further embodiment of the device according to the invention. In this embodiment, the feed pump 3 and the metering pump 4 are arranged to form a structural unit 20. To this end, the feed pump 3 and the metering pump 4 are flanged to two sides of a distributor block 26. Located on the left side is the metering pump 4 and on the right side the feed pump 3. The feed pump 3 includes a set of gears 22 and the metering pump 4 the set of gears 21. The set of gears 21 and the set of gears 22 are jointly driven via a drive shaft 27 and the pump drive 6. To this end, the drive shaft 27 extends through the distributor block 26. The underside of the distributor block 26 contains the dye connection 18, which connects via an inlet line 8 in the distributor block 26 to the feed inlet 9 of the feed pump 3. The dye connection 18 is joined to the tank 1 via a tube or a hose.

Next to the dye connection 18, the underside of the distributor block 26 accommodates the melt connection 19. The melt connection 19 is joined via the metering line 15 to the metering outlet 13 of the metering pump 4.

The feed outlet 10 of the feed pump 3 and the metering inlet 12 of the metering pump 4 are interconnected via a feed line 11 inside the distributor block 26.

Joined to the feed line 11 is a return flow connection 29. The return flow connection 29 connects to a bypass line 25, which accommodates a pressure control valve 24. The bypass line 25 connects the return flow connection 29 to the tank 1. The tank 1 is constructed in the same way as in the foregoing embodiments, so that the foregoing description is herewith incorporated by reference.

In operation, the feed pump 3 and the metering pump 4 are jointly driven by the pump drive 6. In comparison with the set of gears 21 of the metering pump 4, the set of gears 22 of the feed pump 3 is selected such that the feed pump 3 delivers a larger volume than the metering pump 4. The driven set of gears 22 delivers the liquid dye from the tank 1 into the feed line 11. The liquid dye in the feed line 11 is supplied by the metering pump 4 in a measured quantity to the melt connection 19. In this process the feed pressure in the feed line 11 is determined by the pressure control valve 24.

If a limit value of the feed pressure is exceeded in the feed line 11, a partial flow of the liquid dye will be returned via the pressure control valve 24 and the bypass line 25 to the tank 1.

In the embodiment of FIG. 4, the pressure control valve 24 and the bypass line 25 are separately arranged outside of the structural unit. Basically, however, one could also integrate the pressure control valve and the bypass line into the distributor block 26. In this case, the bypass line provides a connection between the feed line 11 and the feed inlet 9 of the feed pump 3.

In the present embodiment, the return flow device 14 is arranged outside of the distributor block 26 directly at the melt connection 19. The return flow device 14 is here formed by a tubular section and a heating device. In the case that the feed pump 3 and the metering pump 4 operate under no pressure, a returning melt flow will solidify inside the tubular section of the return flow device 14. With that, a return flow to the metering pump 4 is interrupted. To release the melt plug in the tubular section, the heater of the return flow device 14 will be activated.

However, it is also possible to use a nonreturn valve as a return flow device. In this case, the nonreturn valve would be opened by the pressure of the liquid dye.

In the illustrated embodiment, one could also arrange the return flow device 14 inside the distributor block 26 between the melt connection 19 and the metering outlet 13.

In the embodiments shown in FIGS. 1, 2, and 4, all melt carrying components can be made heatable. This makes it possible to add to a polymer melt in particular also high-viscosity dyes with an adequate metering accuracy. In the place of the liquid dye, it is naturally possible and advantageous to add also other liquid additives to the melt.

The invention claimed is:

1. An apparatus for injecting a liquid dye into a polymer melt, comprising
   a tank for containing a liquid dye,
   a metering pump having an inlet connected to the tank via a dye feed line, and an outlet for connection to a melt carrying component, and with the metering pump being configured to add measured quantities of the dye from the tank to a melt in the melt carrying component, and
   a feed pump connected in the dye feed line between the tank and the inlet of the metering pump, with the tank being connected to a source of gas pressure so as to generate a gas cushion which acts upon the dye in the tank and so that the dye is delivered to an inlet of the feed pump under a constant pressure.

2. The apparatus of claim 1, further comprising a separate controllable pump drive operatively connected to each of the metering pump and the feed pump, with the pump drives being connected to a control unit.

3. The apparatus of claim 2, further comprising a pressure sensor connected to the dye feed line between the feed pump and the metering pump, with the sensor being connected to the control unit.

4. The apparatus of claim 1 further comprising a one way flow device connected to the outlet of the metering pump.

5. The apparatus of claim 1, further comprising a common pump drive connected to the metering pump and the feed pump, with the pump drive being connected to a control unit.

6. The apparatus of claim 5, wherein the feed pump has a greater delivery volume than the metering pump.

7. The apparatus of claim 1, further comprising a bypass line connected to the dye feed line between the feed pump and the metering pump, and a pressure control valve positioned in the bypass line.

8. The apparatus of claim 7, wherein the bypass line connects to a feed inlet of the feed pump or to the tank.

9. The apparatus of claim 1, further comprising a return flow prevention device connected to the outlet of the metering pump, which is configured to prevent a return flow of the polymer melt from the melt carrying component into the outlet of the metering pump.

10. The apparatus of claim 9, wherein the return flow device comprises a nonreturn valve or a freeze valve.

11. The apparatus of claim 1, wherein the metering pump, the feed pump, and the dye feed line are constructed for being heated.

12. The apparatus of claim 1, wherein the metering pump and the feed pump are part of an integral structure unit, with the structural unit including a melt connection which communicates with the outlet of the metering pump, and with the structural unit being configured so that the melt connection may be selectively connected to any one of several melt carrying components of a spin unit.

13. The apparatus of claim 12, wherein the structural unit further includes a dye connection which communicates with an inlet of the feed pump and which is connected to the tank.

* * * * *